(12) United States Patent
Forrester

(10) Patent No.: US 11,219,197 B1
(45) Date of Patent: Jan. 11, 2022

(54) FISHING LURE

(71) Applicant: Perry Forrester, Houston, TX (US)

(72) Inventor: Perry Forrester, Houston, TX (US)

(*) Notice: Subject to any disclaimer, the term of this patent is extended or adjusted under 35 U.S.C. 154(b) by 287 days.

(21) Appl. No.: 16/587,698

(22) Filed: Sep. 30, 2019

Related U.S. Application Data

(60) Provisional application No. 62/738,327, filed on Sep. 28, 2018.

(51) Int. Cl.
*A01K 85/18* (2006.01)

(52) U.S. Cl.
CPC .................. *A01K 85/18* (2013.01)

(58) Field of Classification Search
CPC ....... A01K 85/005; A01K 85/18; A01K 99/00
USPC ............................................. 43/42.06, 42.32
See application file for complete search history.

(56) References Cited

U.S. PATENT DOCUMENTS

| | | | |
|---|---|---|---|
| 2,574,293 A | 11/1951 | Sabin et al. | |
| 2,629,960 A | 3/1953 | Baxter | |
| 2,796,694 A | 6/1957 | Turner | |
| 2,884,732 A | 5/1959 | Bailer | |
| 3,521,394 A * | 7/1970 | Wintersberger | A01K 85/16 43/42.06 |
| 3,728,811 A | 4/1973 | Weimer | |
| 3,953,934 A * | 5/1976 | Visser | A01K 85/01 43/42.06 |
| 4,616,440 A * | 10/1986 | Millroy | A01K 85/12 43/42.06 |
| 4,735,012 A | 4/1988 | Smith et al. | |
| 4,763,436 A * | 8/1988 | Lindmeyer | A01K 85/02 43/42.06 |
| 4,835,897 A * | 6/1989 | Rudolph | A01K 85/16 43/42.06 |
| 5,018,297 A * | 5/1991 | Kennedy, Jr. | A01K 85/01 43/42.06 |
| 5,054,230 A * | 10/1991 | Woodman | A01K 97/02 43/44.99 |
| 5,097,620 A * | 3/1992 | Nietupski | A01K 85/01 43/42.06 |
| 6,018,901 A * | 2/2000 | DuBois | A01K 85/00 43/42.13 |
| 6,523,297 B1 | 2/2003 | Hair, III et al. | |
| 7,380,365 B2 | 6/2008 | Noraker | |
| 8,402,686 B1 * | 3/2013 | Osburn, III | A01K 85/01 43/17.6 |
| D852,924 S * | 7/2019 | Want | D22/126 |
| 2002/0157300 A1 * | 10/2002 | Saul | A01K 85/00 43/42.33 |
| 2006/0000138 A1 * | 1/2006 | Druk | A01K 91/053 43/42.09 |

(Continued)

*Primary Examiner* — Christopher P Ellis
(74) *Attorney, Agent, or Firm* — Bushman Werner, P.C.

(57) ABSTRACT

A fishing lure having a cylindrical housing forming a cavity or chamber. The front end or wall of the housing is provided with one or more inlet ports as well as a bore for threading a fishing line therethrough. A rear wall has a bore in register with the bore in the front wall. There is an outlet from the chamber for the egress of water from the chamber. Rotatably mounted in the cavity formed by the housing is a rotor which has one or more surfaces with a concave-like surface, the rotor being turned by the action of the water passing through the housing and impinging on the concave-like surface as the lure is pulled through the water.

17 Claims, 2 Drawing Sheets

(56) References Cited

U.S. PATENT DOCUMENTS

| | | | |
|---|---|---|---|
| 2006/0016118 A1* | 1/2006 | Zuk | A01K 97/06 43/42.09 |
| 2007/0101635 A1* | 5/2007 | Rike | A01K 85/01 43/42.06 |
| 2016/0000057 A1* | 1/2016 | Mistilis | A01K 85/10 43/17.6 |
| 2017/0245485 A1* | 8/2017 | Barnett | A01K 93/00 |
| 2020/0281178 A1* | 9/2020 | Breunig | A01K 91/08 |
| 2021/0195883 A1* | 7/2021 | Want | A01K 85/18 |

* cited by examiner

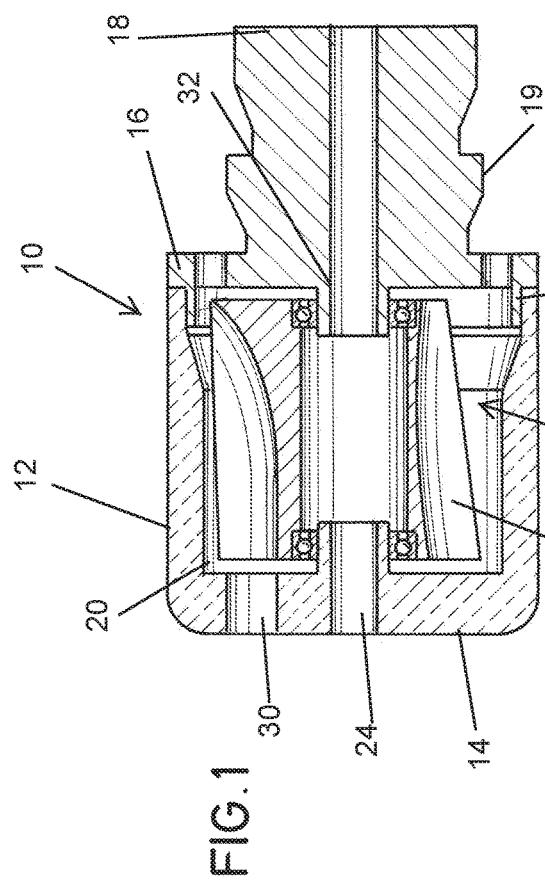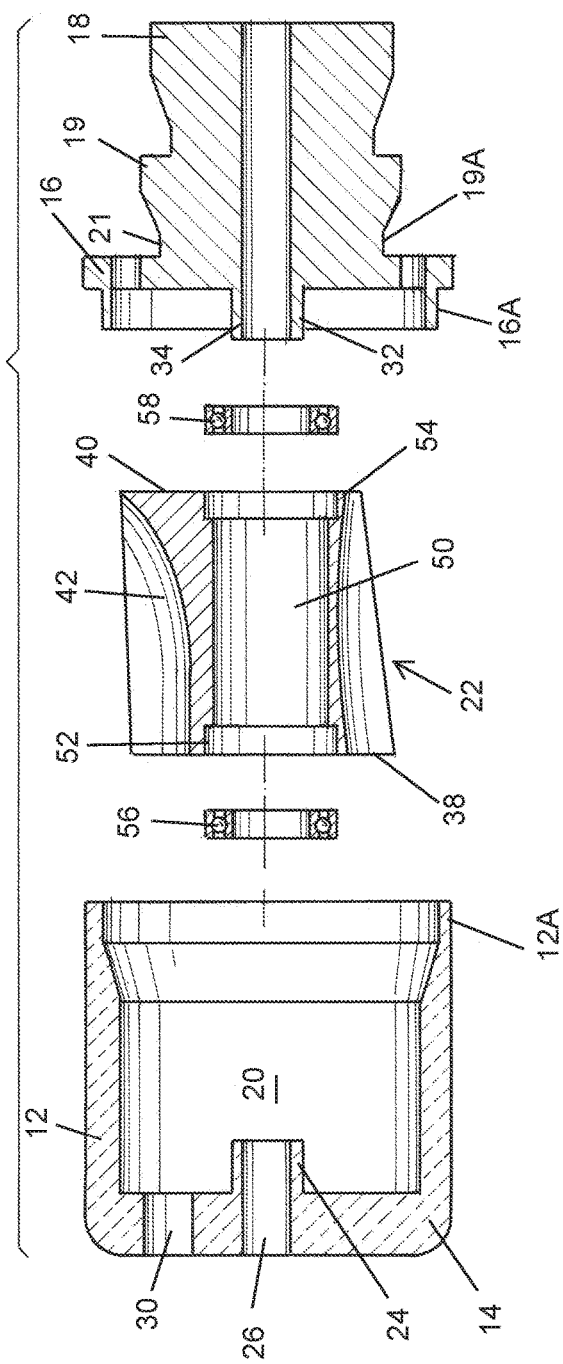

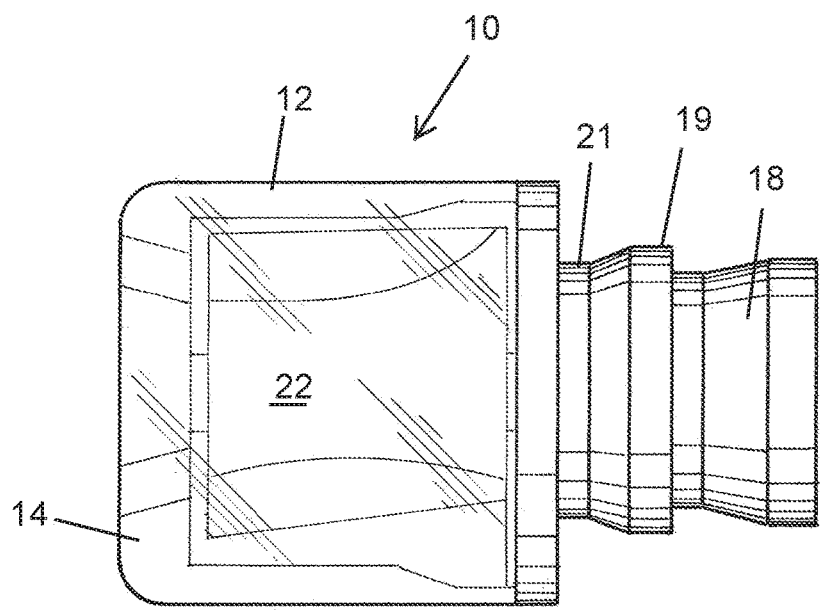
FIG. 3
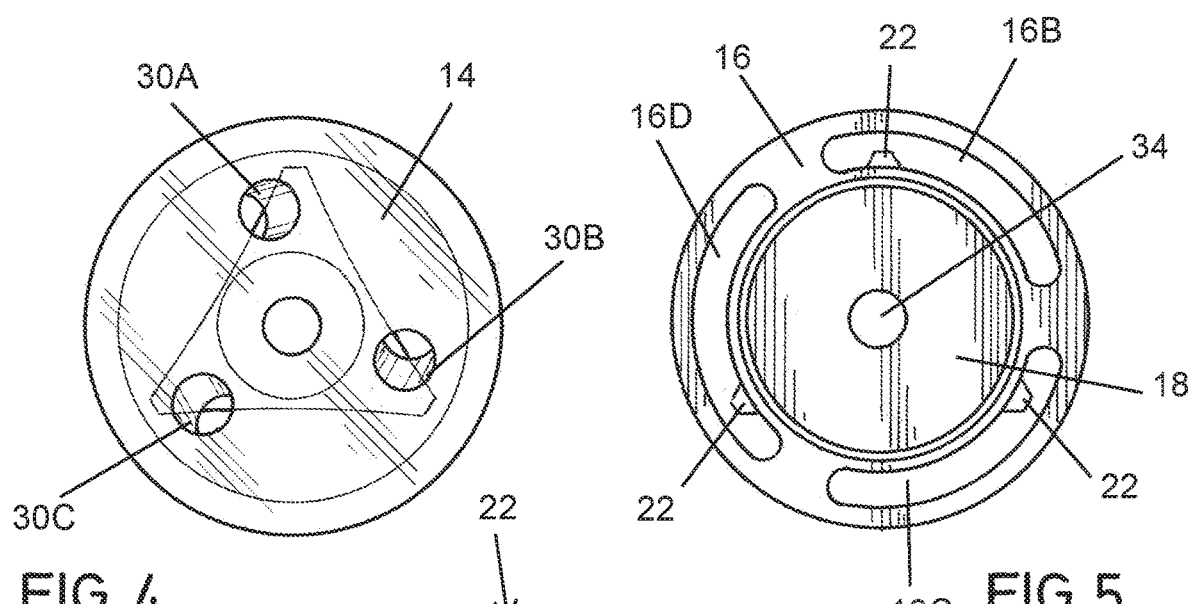
FIG. 4
FIG. 5
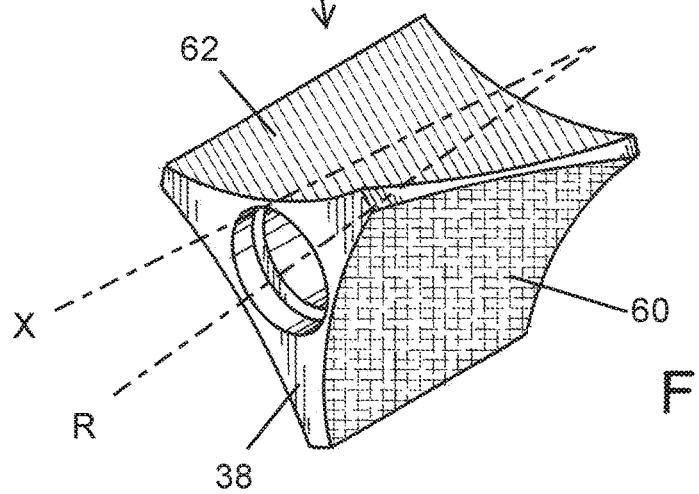
FIG. 6

FISHING LURE

FIELD OF THE INVENTION

The present invention relates to fishing lures and, more particularly, to fishing lures for offshore game fish, primarily billfish.

BACKGROUND OF THE INVENTION

The term "billfish" refers to a group of predatory fish, characterized by prominent bills, or rostra, which are of a large size, some being longer than four meters. Typical billfish include sailfish, marlin, and swordfish. Billfish are largely found in tropical and subtropical waters, albeit that swordfish can be found in more temperate waters as well.

Billfish are perhaps the number one game fish sought by offshore fishermen and are the subject of many tournaments held in many places around the world. In many of these tournaments, the cash prizes are substantial. Accordingly, charter boat captains as well as private owners of offshore fishing vessels entering the tournaments use every legal means possible to attract and catch the most and biggest fish.

Obviously, lures play a big part in fish attraction. As well, in fishing for billfish so called teasers are frequently used. Teasers are effectively hookless lures which are pulled behind in the boat wake, skipping to the rhythm produced by the motors. When a fish strikes a teaser, it is common practice to present an offering of a real fish or bait with a hook, or an artificial lure in the attempt to entice the already excited fish into grabbing the lure or the bait containing a hook.

Lures come in a myriad of shapes and colors and are adorned with trailers, skirts, and the like, all designed to attract fish. In particular much attention is paid to designing lures which are hopefully the visibly most alluring and run true, and particularly such true running lures which generate bubbles or a "wake" when being pulled through the water.

SUMMARY OF THE INVENTION

In one aspect the present invention relates to a fishing lure or teaser primarily for offshore fishing.

In another aspect, the present invention relates to a fishing lure that can generate reflections as it is pulled through the water.

In a further aspect, the present invention relates to a lure which runs true as it is being pulled through the water.

In still another aspect, the present invention relates to a billfish lure which runs true and generates a train of bubbles or a wake when pulled through the water.

These and further features and advantages of the present invention will become apparent from the following detailed description, wherein reference is made to the figures in the accompanying drawings.

BRIEF DESCRIPTION OF THE DRAWINGS

FIG. 1 is a side elevational view, partly in section, of one embodiment of the lure of the present invention.

FIG. 2 is an exploded view of the lure shown in FIG. 1.

FIG. 3 is a side, elevational view of one embodiment of the lure shown in FIG. 1.

FIG. 4 is a front, elevational view of the lure shown in FIG. 1.

FIG. 5 is a back, elevational view of the lure shown in FIG. 1.

FIG. 6 is a perspective view of one embodiment of a rotor for use in one embodiment of the lure shown in FIG. 1.

DETAILED DESCRIPTION OF PREFERRED EMBODIMENTS

Referring first to FIGS. 1 and 2, the lure of the present invention, shown generally as 10, comprises a housing having a cylindrical wall 12, a front wall 14, and a back wall 16. As shown in FIG. 1, back wall 16 is connected to a tail piece 18, which as shown in FIG. 1, is integrally formed with back wall 16, but which could be a separate piece and connected by means well known to those skilled in the art to back wall 16. An annular serration 19 is externally formed on tailpiece 18. Cylindrical wall 12, front wall 14, and back wall 16, cooperate to form an internal cavity 20. It should be noted that while front wall 14 is shown as being integrally formed with cylindrical wall 12, front wall 14 could be formed as a separate piece and attached to cylindrical wall 12.

As shown in FIG. 2, front wall 14 has an axially inwardly extending boss 24 having a bore 26 therethrough. Front wall 14, as shown particularly in FIG. 4, also has three angled ports 30A, 30B, and 30C which open into cavity 22. Still referring to FIG. 2, back wall 16 includes an axially inwardly extending boss 32 with a passageway 34 extending therethrough and through tailpiece 18. When assembled as shown in FIG. 1, bore 16 and passageway 34 are in register whereby a fishing line can be passed through bore 16, bore 50 in rotor 22, and passageway 34.

As can be seen with respect to FIG. 5, back wall 16 has three circumferentially spaced, arcuately shaped apertures 16B, 16C, and 16D and an annular, axially extending skirt 16A which is received in an annular recess 12A formed in cylindrical wall 12.

FIG. 3 demonstrates the translucent or transparent characteristic of the cylindrical housing formed by cylindrical wall 12. It will be apparent that while the cylindrical housing formed by cylindrical wall 12 can be translucent or transparent. Front wall 14, although shown as translucent, could be a separate piece and could be opaque. As will be understood, the translucent or transparent nature of cylindrical wall 12 ensures that rotor 22 is visible through cylindrical wall 12. In the case of wall 12 being translucent, it will be sufficiently lucid such that rotor 22 and/or the reflecting surface of rotor 22 will generate visible flashes of light which can be observed through wall 12.

Disposed in cavity 20 is a rotor shown generally as 22, rotor 22 being rotatably mounted in cavity 20 as described more fully hereafter. Rotor 22 has a front face 38 and a back face 40. Extending between faces 38 and 40 is a longitudinal, concavely shaped surface 42 having a longitudinal axis X lying on the center of curvature of surface 42, axis X being skewed with respect to a longitudinal axis Y extending longitudinally through rotor 22 and being perpendicular to faces 38 and 40, as shown in FIG. 6. As shown, there are three such surfaces 42 although one or two such surfaces will render the rotor functional for its intended use. Rotor 22 has a throughbore 50, counterbores 52 and 54 being formed in the opposite ends of bore 50. Counterbores 52 and 54 form seating surfaces for annular bearing assemblies 56 and 58, respectively.

Although as described above, back wall 16 is provided with arcuately spaced apertures 16B-16D for the egress of water flowing through the cavity 22, it is to be understood that any ports or apertures could be formed in cylindrical wall 12 at a position which ensured that water flowing through cavity 22 as the lure is pulled through the water would impinge upon the concavely shaped surface 42 so as to create an unbalanced force on the rotor 22 causing it to rotate in response to the lure being pulled through the water. However, the use of the arcuately shaped apertures 16B-16D is a preferred embodiment since it is believed they provide a more uniform wake or bubble trail as the lure is moving through the water.

Turning to FIG. 6, the rotor 22 is shown as having surfaces 42 coated or overlaid with a light-reflecting coating or film, a preferred film being a color-shifting, holographic film available, for example, from Identi-Tape, Inc. In the embodiment shown in FIG. 6, two of the three concave surfaces 42 are seen as being coated or overlaid with different color shifting film(s) 60 and 62, it being understood that the third concave surface 42 not shown could be coated with the same or different film as either 60 or 62. It is also to be understood that the concave surfaces 42 can be painted with light reflecting coatings.

As noted above, tail piece 18 is provided with an external, annular serration 19. As is well known to those skilled in the arts, fishing lures of the type under consideration, commonly use skirts comprised of an annular, elastic collar to which are attached flexible streamers. Such skirts are well known to those skilled in the art. It will be apparent that such skirts can be readily attached to lure 10 by expanding the flexible collar over serration 19 whereupon its elasticity will cause it to grip surface 19A formed between serration 19 and back wall 16.

In use, a fishing line would extend through lure 10 and more specifically the registering bores and passageways described above. In use, when lure 10 either acting as a lure per se with a suitable skirt and hook, or as a teaser, is pulled through the water, water will flow into chamber 20 through ports 30A, 30B, and 30C and will impinge upon one or more of the concave surfaces 42 exerting unbalanced forces against those surfaces which will cause rotor 22 to spin. The water exiting through slots 16B, 16C, and 16D will leave a wake or trail of bubbles enhancing the lure's fish-attracting capability. As well, the color-shifting surfaces, e.g., surfaces 60 and 62 on spinning rotor 22 will result in intermittent "flashes" of light further enhancing the fish-attracting capabilities of the lure of the present invention.

In actual trials, it has been found that the lure 10 constructed substantially as described above, runs true as it is being retrieved. This characteristic coupled with the wake of bubbles and intermittent flashes result in enhanced strikes from billfish.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A fishing lure comprising:
   a housing, said housing having a front wall, a spaced back wall, and a transparent peripheral wall, a cavity being formed in said housing, said front wall having a first centrally disposed bore therethrough, said back wall having a second centrally disposed bore therethrough, there being at least one inlet in said front wall, and at least one outlet from said cavity;
   a rotor rotatably mounted in said cavity, said rotor having a first end, a second end, and a centrally disposed throughbore therethrough, said throughbore and said first and second bores being in register, said rotor having at least one external longitudinally extending concavely shaped surface having a longitudinal axis lying on the center of curvature of said surface and being skewed with respect to an axis passing through said passageway.

2. The fishing lure of claim 1, wherein said surface comprises a portion of a cylindrical surface, the imaginary cylinder of which has an axis skewed with respect to an axis passing longitudinally through said central disposed passageway.

3. The fishing lure of claim 1, wherein said housing and said rotor are made of a plastic material.

4. The fishing lure of claim 1, wherein said surface is coated with a light-reflecting material.

5. The fishing lure of claim 4, wherein said material comprises a color-shifting film.

6. The fishing lure of claim 1, wherein there are three circumferentially spaced surfaces on said rotor.

7. The fishing lure of claim 6, wherein all of said surfaces are coated with a light-reflecting material.

8. The fishing lure of claim 7, wherein said material comprises a color-shifting film.

9. The fishing lure of claim 1, wherein said outlet is in said back wall.

10. The fishing lure of claim 9, wherein there are three circumferentially spaced, arcuately shaped apertures in said back wall.

11. The fishing lure of claim 1, wherein said throughbore in said rotor has a first end and a second end, there being a first counterbore formed in said first end and a second counterbore formed in said second end.

12. The fishing lure of claim 11, wherein said front wall has an axially inwardly extending boss in surrounding relationship to said first bore and said back wall has a second axially inwardly extending boss in surrounding relationship to said second bore.

13. The fishing lure of claim 12, wherein there is a first bearing assembly received in said first counterbore and a second bearing assembly received in said second counterbore.

14. The fishing lure of claim 1, wherein there is a tail piece attached to said back wall, said tail piece being adapted to have a lure skirt attached thereto.

15. The fishing lure of claim 14, wherein there is a passageway through said tail piece, said passageway being in open communication with said second bore in said back wall.

16. The fishing lure of claim 14, wherein said tail piece has at least one annular serration.

17. The fishing lure of claim 15, wherein said back wall and said tail piece constitute a monolithic structure.

* * * * *